United States Patent [19]

Shigematsu et al.

[11] Patent Number: 5,680,491
[45] Date of Patent: *Oct. 21, 1997

[54] OPTICAL FIBER DISPERSION COMPENSATION DEVICE FOR OPTICAL COMMUNICATION SYSTEM

[75] Inventors: Masayuki Shigematsu; Tomonori Kashiwada; Masayuki Nishimura, all of Yokohama, Japan

[73] Assignee: Sumitomo Electric Industries, Ltd., Osaka, Japan

[*] Notice: The term of this patent shall not extend beyond the expiration date of Pat. No. 5,430,822.

[21] Appl. No.: 657,560

[22] Filed: Jun. 4, 1996

Related U.S. Application Data

[60] Continuation of Ser. No. 405,693, Mar. 17, 1995, abandoned, which is a division of Ser. No. 127,338, Sep. 28, 1993, Pat. No. 5,430,822.

[30] Foreign Application Priority Data

Sep. 29, 1992 [JP] Japan .................... 4-260007

[51] Int. Cl.$^6$ .................................................. G02B 6/28
[52] U.S. Cl. ............... 385/24; 359/161; 359/173; 385/27; 385/123
[58] Field of Search ................. 385/15, 24, 27, 385/28, 50, 51, 123, 124; 359/161, 173, 179, 188, 195

[56] References Cited

U.S. PATENT DOCUMENTS

| | | | |
|---|---|---|---|
| 4,261,639 | 4/1981 | Kogelnik et al. | 385/27 |
| 4,969,710 | 11/1990 | Tick et al. | 385/123 |
| 5,218,662 | 6/1993 | Dugan | 385/123 |
| 5,261,016 | 11/1993 | Poole | 385/28 |
| 5,274,733 | 12/1993 | Prigent et al. | 385/123 |
| 5,355,240 | 10/1994 | Prigent et al. | 359/161 |
| 5,371,815 | 12/1994 | Poole | 385/28 |
| 5,404,413 | 4/1995 | Delavaux et al. | 385/15 |
| 5,430,822 | 7/1995 | Shigematsu et al. | 385/123 |

FOREIGN PATENT DOCUMENTS

| | | |
|---|---|---|
| 0464812 | 1/1992 | European Pat. Off. . |
| 62-18131 | 1/1987 | Japan . |

OTHER PUBLICATIONS

Patent Abstracts of Japan, vol. 15, No. 407 (P–1286) 10 Dec. 1991 and JP–A–03 211 530 (Mitsubishi Electric) "abstract".

J.M. Dugan et al., "All Optical, Fiber-Based 1550 nm Dispersion Compensation in a ... Optimized Fiber", Optical Fiber Communication Conference, vol. 5, Feb. 1992, pp. 367–370.

*Primary Examiner*—John D. Lee
*Attorney, Agent, or Firm*—Cushman Darby & Cushman IP Group of Pillsbury Madison & Sutro, LLP

[57] ABSTRACT

An optical communication system that compensate for the dispersion of an optical fiber serving as a transmission path is provided. In its simplest form, a dispersion compensating fiber having a sufficient length to compensate for the chromatic dispersion of the optical fiber is divided into portions, each portion having a length selected so as to maintain a linear characteristic of a relative intensity noise of the dispersion compensating fiber, and the divided portions of the dispersion compensating fiber are inserted in the path of the optical fiber while they are optically separated.

10 Claims, 10 Drawing Sheets

OPTICAL FIBER DISPERSION COMPENSATION DEVICE FOR OPTICAL COMMUNICATION SYSTEM

This is a continuation of application Ser. No. 08/405,693, filed on Mar. 17, 1995 (abandoned), which was abandoned upon the filing hereof, which is a division of application Ser. No. 08/127,338 filed Sep. 28, 1993 which issued as U.S. Pat. No. 5,430,822 on Jul. 4, 1995.

BACKGROUND OF THE INVENTION

1. Field of the Invention

The present invention relates to a dispersion compensation technique for an optical fiber as a transmission path in an optical communication system.

2. Related Background Art

In an optical communication system, an optical fiber is used as a transmission path. A signal light output from an optical transmitter is propagated in the optical fiber to conduct the optical communication. In the past, a laser diode, which emits a laser beam having a center wavelength of 1.3 µm, was used as the optical transmitter and an optical fiber for a 1.3 µm band was installed as the transmission path to conduct the digital transmission (optical communication). Thereafter, it has been found that the wavelength of 1.55 µm exhibits a minimum transmission loss in the glass used as the material of the optical fiber, and it is known to propagate a laser beam having a center wavelength of 1.55 µm through the existing optical fiber in order to attain the communication over a longer distance. However, the laser diode has a specific spectrum width ($\Delta\omega$) in its oscillation wavelength. The propagation speeds in the optical fiber are different between a short wavelength component and a long wavelength component contained in the signal light (dispersion characteristic of the optical fiber). Thus, when the laser beam having the center wavelength of 1.55 µm is propagated through the optical fiber optimized for the 1.3 µm band, the optical signal is distorted so that the transmission distance, the transmission band, and the bit rate are limited.

In order to compensate for the dispersion characteristic of the optical fiber, dispersion compensation techniques disclosed in Japanese Laid-Open Patent Application 62-65529 and Conf. on Optical Fiber Comm. 1992. PD-14, PD-15 have been proposed. An optical fiber having a dispersion characteristic opposite to that of the optical fiber used as the transmission path is inserted to compensate the dispersion characteristic.

On the other hand, the inventors of the present invention have proved that the longer the optical fiber, the more the dispersion compensating fiber and a carrier to noise ratio (CNR) is deteriorated, which impedes good optical communication.

SUMMARY OF THE INVENTION

In the present invention, it is intended to construct an optical CATV network as an optical communication system. More specifically, when an optical signal having a center wavelength of 1.55 µm is to be used while using a fiber optical amplifier (doped with erbium $Er^{3+}$), an optical fiber for the 1.3 µm (single-mode fiber) may have to be used, or an optical signal having the center wavelength of 1.3 µm may be propagated through the single mode fiber at a 1.55 µm wavelength.

It is an object of the present invention to construct an optical communication system which compensates a dispersion of an optical fiber and overcomes the problem in the above-mentioned environment.

In accordance with a first aspect of the present invention, a dispersion compensating fiber which sufficiently compensates the dispersion of the optical fiber used as the transmission path is divided into at least two fibers, and the first and second divided dispersion compensating fibers are connected in series to the opposite ends of the optical fiber.

The dispersion compensating fiber has an opposite dispersion characteristic to a dispersion characteristic of the optical fiber and the length thereof is limited to a range in which a relative intensity noise (RIN) of the dispersion compensating fiber can retain a proportional relationship to the length. Accordingly, the dispersion compensating fiber is divided into a plurality of dispersion compensating fibers within that length, or the above-mentioned first and second dispersion compensating fibers are further divided.

Because each of the dispersion compensating fibers includes a large amount of element (for example, germanium which may be doped with $Er^{3+}$) added to a core, it has a large RIN due to multi-reflection by Rayleigh scattered light, and it increases at a larger rate than a rate to be proportional to the length.

Accordingly, by connecting the dispersion compensating fibers, which meet the proportional condition in series to the optical fiber at a plurality of points on the transmission path, the RIN may be suppressed low in compensating the dispersion of the optical fiber.

In accordance with a second aspect of the present invention, a plurality of divided dispersion compensating fibers are connected in series to an optical transmitter side end of the optical fiber used as the transmission path.

In accordance with a third aspect of the present invention, a plurality of divided dispersion compensating fibers are connected in series to an optical receiver side end of the optical fiber used as the transmission path.

In the first to third aspects, it should be noted that the divided dispersion compensating fibers are optically spaced from each other to assure that rear scattered light generated therein is sufficiently attenuated, because the rear scattered light is one cause of the transmission loss.

In a first aspect, to optically space the dispersion compensating fibers, an optical fiber having a length to sufficiently attenuate the rear scattered light is used as a connecting member to serially connect the dispersion compensating fibers.

In a second aspect, an optical isolator is used as the connecting member to serially connect the dispersion compensating fibers.

In a third aspect, an optical coupler having a loss to sufficiently attenuate the rear scattered light is used as the connecting member, to serially connect the dispersion compensating fibers.

Where the optical fiber is used as the connecting member, the optical fiber may be used as the transmission path. In the first to third aspects, it is assumed that the already installed optical fiber cable is used. If the optical fiber which is the connecting member is used as the transmission path, the configuration having the dispersion compensating fibers connected in series between one transmission path and another transmission path is provided.

When a fiber optical amplifier doped with $Er^{3+}$ is used as the optical fiber which is the connecting member, the increase of a transmission loss can be prevented.

When the lengths of the dispersion compensating fibers are equal to each other, normalization in system design such as providing a dispersion compensating fiber at as predetermined pitch for a given optical fiber is attained. As a result, a design efficiency is improved and a labor productivity is improved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only. Various changes and modifications within the spirit and scope of the invention will become apparent to those skilled in the art form this detailed description.

DETAILED DESCRIPTION OF THE PREFERRED EMBODIMENTS

Embodiments of the optical communication system of the present invention are explained below with reference to FIGS. 1 to 16.

Figure 1:
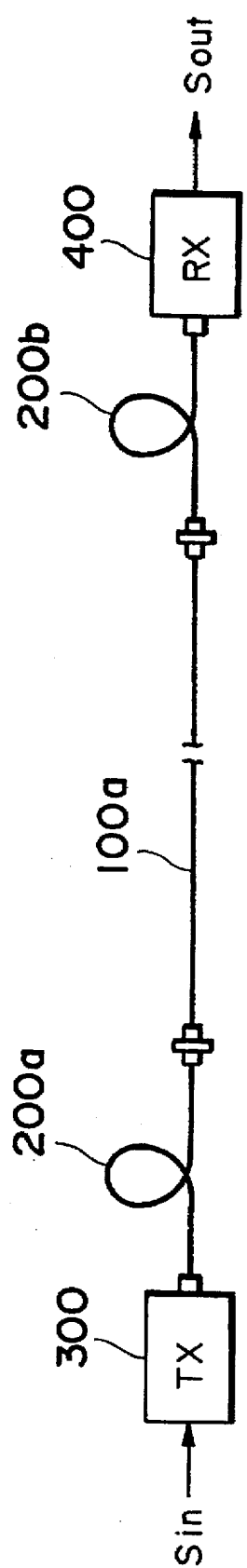
FIG. 1 shows a first configuration of an optical communication system of the present invention.

FIG. 1 shows a simplest one of a first configuration of the optical communication system of the present invention.

In the present communication system, simple one-to-one communication is performed. A first optical fiber 100a is used as a transmission path from an optical transmitter 300 to an optical receiver 400. The optical receiver 400 receives an optical signal from the optical transmitter 300 which converts an electrical signal $S_{in}$ to the optical signal, and outputs an electrical signal $S_{out}$. Two dispersion compensating fibers of the same length are used to compensate the dispersion of the first optical fiber 100a, and the first and second dispersion compensating fibers 200a and 200b are connected in series at the opposite ends of the first optical fiber 100a.

The total length of the first and second dispersion compensating fibers 200a and 200b is long enough to compensate the dispersion of the first optical fiber 100a and the length of each of the first and second dispersion compensating fibers 200a and 200b is respectively limited to a range in which the RIN of the dispersion compensating fiber can retain a proportional relationship to the length.

A specific configuration in which the optical communication system shown in FIG. 1 (first configuration) is configured as a system for 40-channel amplitude modulated vestigial sideband (AM-VSB) transmission is explained.

An optical transmitter 300 converts an input electrical signal $S_{in}$ to an optical signal and it uses a distributed feed-back laser diode (DBF-LD) having an oscillation wavelength of 1.552 μm and an optical output of +7 dBm. A distortion characteristic or composite second-order distortion (CSO) thereof is −62.3 dB and a modulation index per channel is 4%. The input signal $S_{in}$ is 40 channels of AM-VSB and frequency division multiplexing (FDM) video signals. The range of carrier frequencies thereof is from 91.25 MHz to 337.25 MHz.

Figure 2:
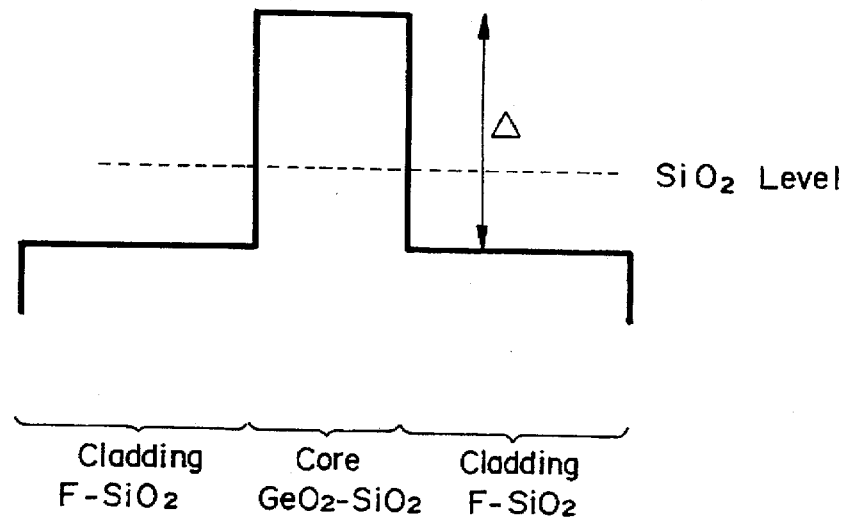
FIG. 2 shows a refractive index distribution of a dispersion compensating fiber.

A single mode fiber of a 10 km length for a 1.3 μm band is used as the optical fiber 100 which is a transmission path. A dispersion value of the first optical fiber 100a is approximately 17 ps/nm/km at a wavelength of 1.552 μm and a transmission loss is 0.2 dB/km. The first and second dispersion compensating fibers 200a and 200b have a germanium doped silica core of 1.7 μm in diameter and a fluorine doped silica cladding. A refractive index distribution thereof is shown in FIG. 2. A refractive index difference Δ of the first dispersion compensating fiber 200a is 2.8%, a transmission loss at a wavelength of 1.552 μm is 0.87 dB/km, a mode field diameter (MFD) is 3.7 μm, and a dispersion value is −95 ps/nm/km. These parameters of the second dispersion compensating fiber 200b are same values. The lengths thereof are 1 km, respectively. An optical receiver 400 converts an optical signal propagated through the first optical fiber 100a to an electrical signal $S_{out}$.

Figure 3:
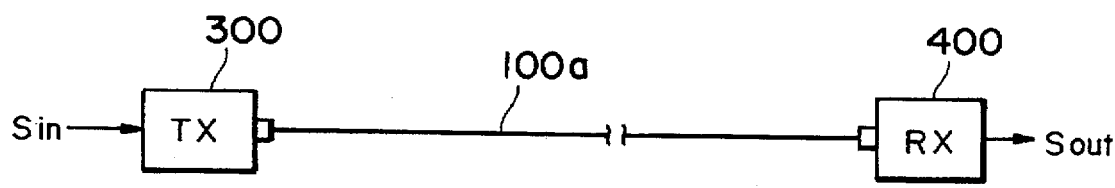
FIG. 3 shows a configuration of an optical communication system which is a first comparative example.
Figure 4:
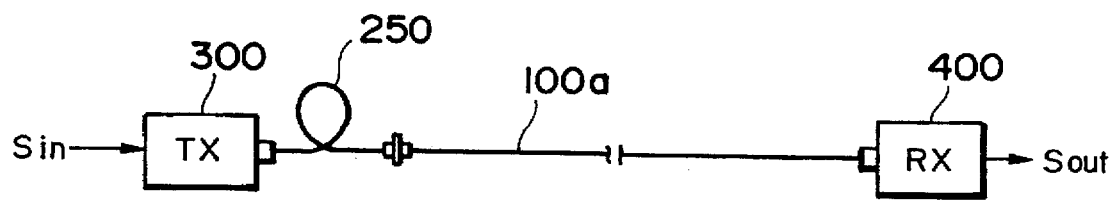
FIG. 4 shows a configuration of an optical communication system which is a second comparative example.

FIGS. 3 and 4 show comparative examples for proving the improvement in a CNR and a CSO in the optical communication system of the present invention (first configuration). The components thereof are identical to those of the optical communication system of the present invention shown in FIG. 1.

FIG. 3 shows a first comparative example of a configuration without a dispersion compensating fiber, and FIG. 4 shows a second comparative example of a configuration in which one dispersion compensating fiber 250 is used. In FIG. 4, the dispersion compensating fiber 250 has the same composition as those of the first and second dispersion compensating fibers 200a and 200b of the optical communication system shown in FIG. 1. The length thereof is 2 km to compensate the dispersion of the first optical fiber 100a.

The CNRs and the CSOs were measured for the optical communication system shown in FIG. 1, the first comparative example shown in FIG. 3 and the second comparative example of FIG. 4. The received power at the optical receiver 400 was adjusted to −1.5 dBm by inserting a variable attenuator.

The results of the measurement are shown below.

(1) The optical communication system shown in FIG. 1 (The first configuration in the present invention)

CNR=50.8 dB

CSO=−62.3 dB (2) The first comparative example shown in FIG. 3

CNR=51.2 dB

CSO=−53.7 dB (3) The second comparative example shown in FIG. 4

CNR=49.9 dB

CSO=-62.1 dB

By compensating the dispersion of the first optical fiber 100a, the degraded CSO in the first comparative example shown in FIG. 3 is improved in the systems shown in FIGS. 1 and 4. The improved CSO is substantially equal to the intrinsic CSO of the optical transmitter itself. On the other hand, the CNR dropped by 1.3 dB in the second comparative example shown in FIG. 4 owing to the connection of the dispersion compensating fiber 250, while the deterioration of the CNR in the system shown in FIG. 1 is small. Namely, by serially connecting the dispersion compensating fibers divided into a predetermined length to the first optical fiber 100a at a plurality of points on the transmission path, the RIN can be suppressed and the CSO is improved at the same time.

Figure 5:
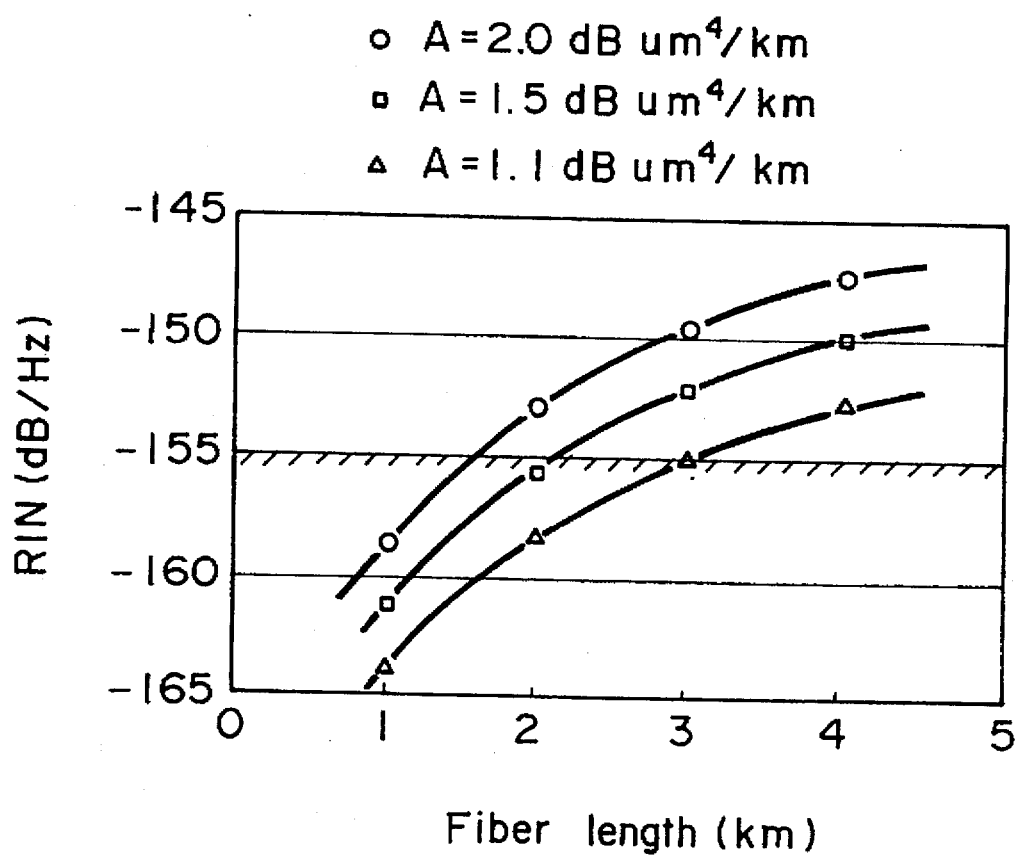
FIG. 5 shows a relation between a length of the dispersion compensating fiber and a RIN.

As for the reason therefor, the inventors observes as follows. In general, a large amount of elements are added to the core of the dispersion compensating fiber in order to attain a desired characteristic. For example, in the dispersion compensating fiber of the present embodiment, germanium is added. When an optical amplification function is desired, $Er^{3+}$ may be further added. As a result, the relative intensity noise (RIN) by the multi-reflection due to the Rayleigh scattered light is large and it significantly increases relative to the length. FIG. 5 shows a relation between the RIN and the fiber length for different Rayleigh scatter coefficients A. It increases with a larger factor than a proportional factor. As a result, as seen in the second comparative example shown in FIG. 4, the RIN is deteriorated by simply serially connecting the dispersion compensating fiber of a sufficient length to compensate the dispersion of the first optical fiber 100a, and it leads to the deterioration of the CNR. Where the first optical fiber 100a is long, the dispersion compensating fiber of a correspondingly long length is required. Thus, the length of the first optical fiber 100a is limited in order to attain a high CNR.

In the optical communication system of the present invention (first configuration), the first and second dispersion compensating fibers 200a and 200b are connected serially to the ends of the first optical fiber 100a so that a total length of the first and second dispersion compensating fibers 200a and 200b attains the desired dispersion compensating.

In the present configuration, it may be considered that the first optical fiber 100a is used as a connecting member to serially connect the first and second dispersion compensating fibers 200a and 200b. Thus, a rear scattered light of the Rayleigh scattered light is attenuated by the first optical fiber 100. Since the first and second dispersion compensating fibers 200a and 200b are optically spaced from each other to an extent for the rear scattered light to be sufficiently attenuated, the multi-reflection is reduced. Therefore the RIN is suppressed and the CSO is improved. A transmission loss between the first dispersion compensating fiber 200a and the second dispersion compensating fibers 200b may be 3 dB or higher judging from the above result.

The CNR is restricted by a larger one of the RINs of the first and second dispersion compensating fibers 200a and 200b. The dispersion compensating fibers 200a and 200b are further divided to prevent a large RIN from appearing so that the CNR is improved and a long distance optical communication is attained.

When the first and second dispersion compensating fibers 200a and 200b are to be divided, the divided dispersion compensating fibers 201a and 201b are serially connected through the connecting member.

Figure 6:
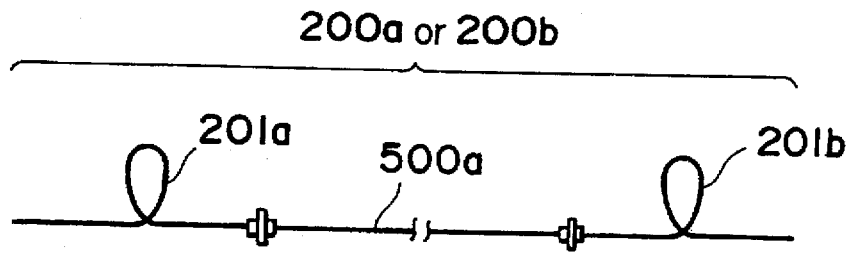
FIGS. 6 to 8 show applications of the optical communication system shown in FIG. 1.

A second optical fiber (a third optical fiber) 500a shown in FIG. 6 may be used as the connecting member when the first dispersion compensating fiber 200a or the second dispersion compensating fiber 200b is to be divided. The second optical fiber 500a has a length to sufficiently attenuate the rear scattered light generated in the dispersion compensating fiber 200a or 200b. In the present configuration, a total length of the dispersion compensating fibers 200a and 200b is long enough to compensate the dispersions of the first optical fibers 100a and the second optical fiber 500a.

Where $Er^{3+}$ is doped to the second optical fiber 500a to construct the optical fiber amplifier, the increase of a transmission loss can be prevented.

Figure 7:
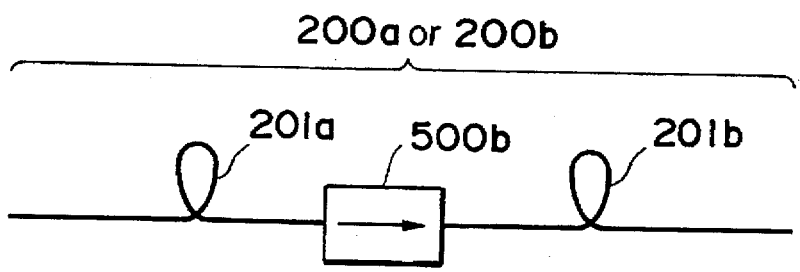
Figure 8:
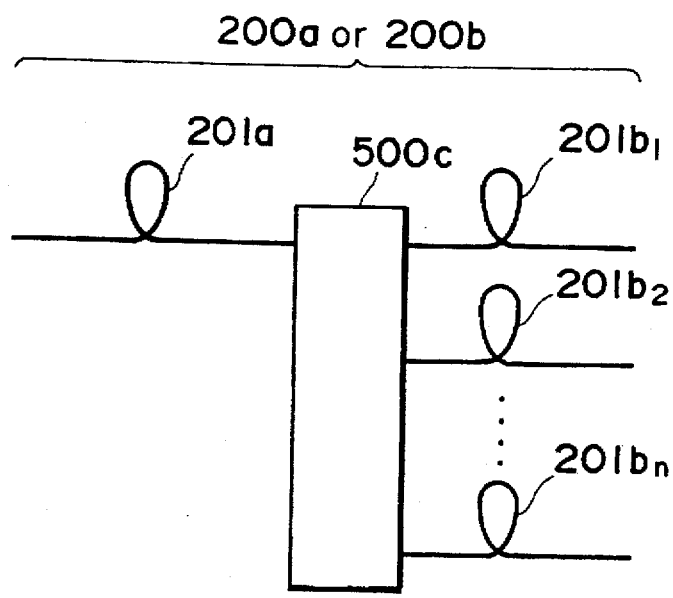

An optical isolator 500b shown in FIG. 7 may be used as the connecting member.

Where an optical coupler 500c having a loss of 3 dB as shown in FIG. 8 is used as the connecting member, a configuration equivalent to that in which the dispersion compensating fiber 201a and the dispersion compensating fibers $201b_1$–$201b_n$ are connected in series is attained, and a configuration which is applicable to one-to-multi, multi-to-one or multi-to-multi optical communication network is attained.

As shown in the application of FIG. 6, the system design may be normalized by providing a dispersion compensating fiber at a predetermined pitch by using the second optical fiber (the third optical fiber) 500a as the transmission path. As a result, the design efficiency is improved and a labor productivity of the system designer is improved. While the dispersion compensating fiber is divided into two fibers in the present embodiment, the dispersion compensating fiber may be divided into three or more fibers depending on the RIN and CNR required, and the connecting member for the dispersion compensating fibers may be those shown in FIGS. 6–8.

A second configuration of the optical communication system of the present invention is explained with reference to FIGS. 9–12.

In the second configuration, third and fourth dispersion compensating fibers 210a and 210b are serially connected to the fourth optical fiber 100b at an end facing the optical transmitter 300 through a connecting member. A total length of the third and fourth dispersion compensating fibers 210a and 210b is long enough to compensate the dispersion of the fourth optical fiber 100b.

Figure 9:
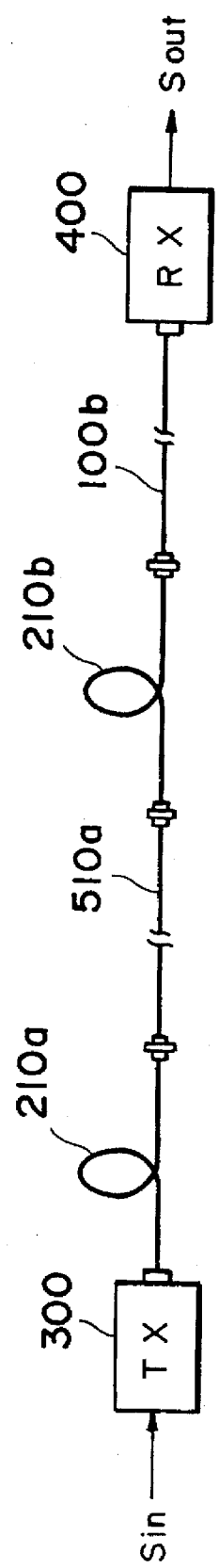
FIGS. 9 to 12 show applications of a second configuration of the optical communication system of the present invention.

The connecting member may be an optical fiber 510a shown in FIG. 9. The fifth optical fiber (sixth optical fiber, seventh optical fiber) 510a may be used as a transmission path or it may be doped with $Er^{3+}$ for use as an optical fiber amplifier.

Figure 10:
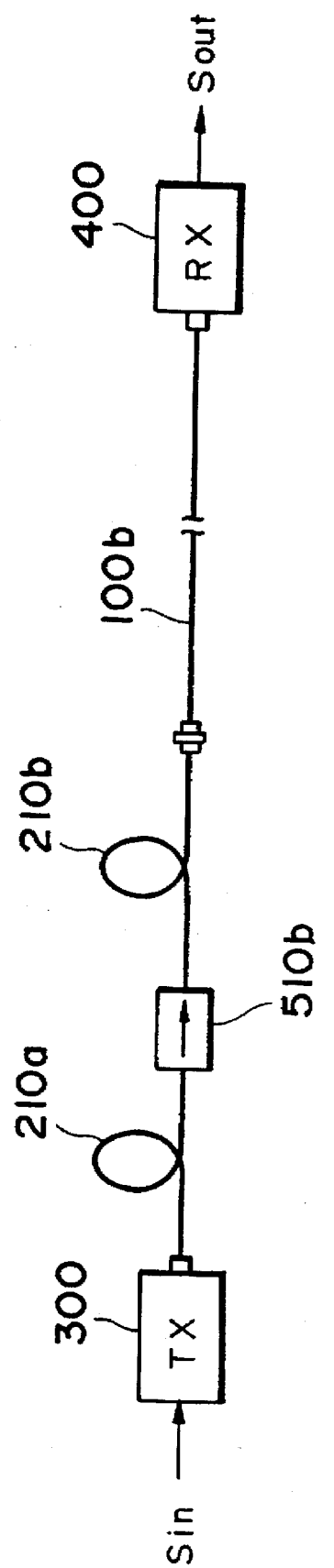

As another connecting member, an optical isolator 510b shown in FIG. 10 may be used. It has been known that the optical isolator 510b is usually fabricated by using a YAG crystal containing Bi.

Figure 11:
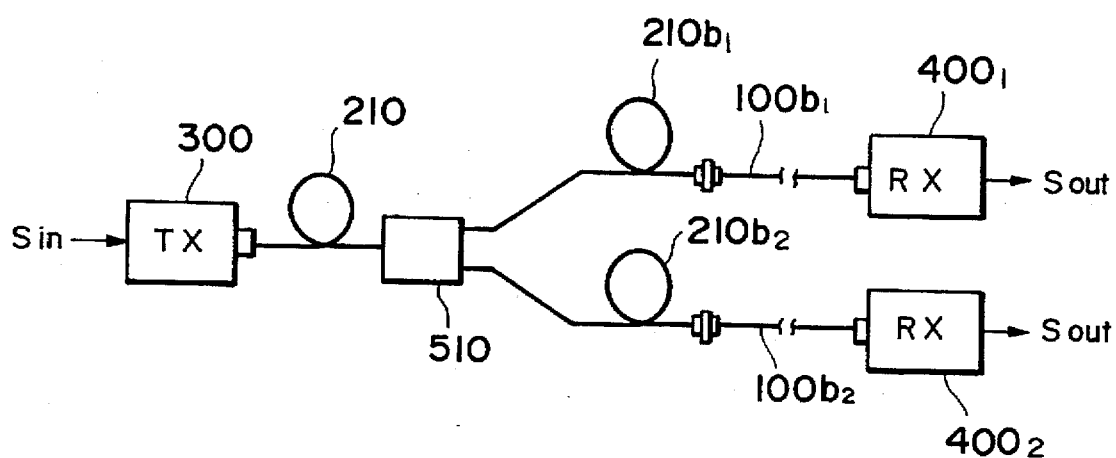

As a further connecting member, as shown in FIG. 11 (1-to-2 optical communication), an optical coupler 510c may be used and the rear scattered lights of the third and fourth dispersion compensating fibers 210a and 210b may be attenuated by an insertion loss of the optical coupler 510c.

Figure 12:
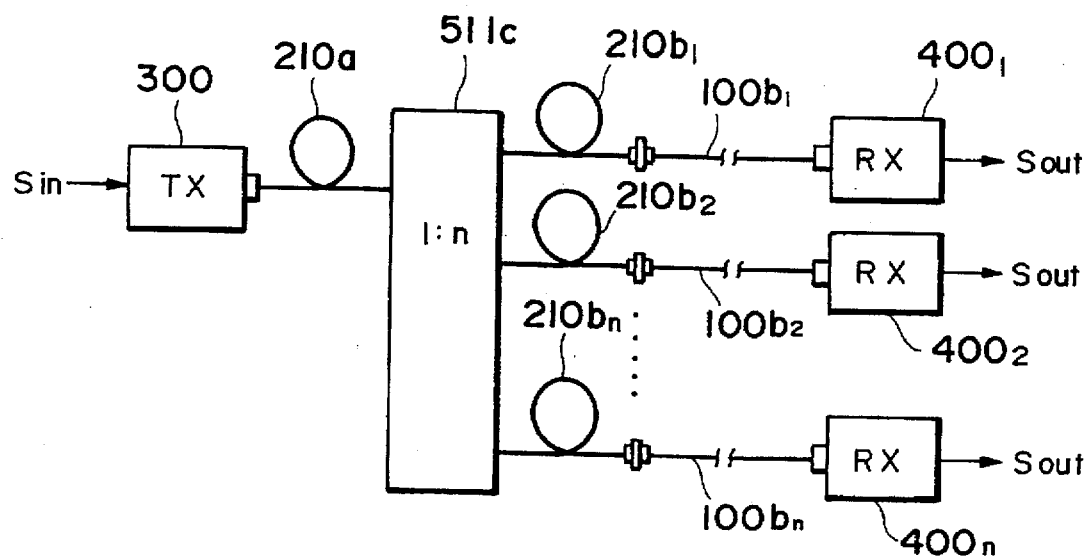

FIG. 12 shows a configuration of a one-to-multi optical communication by using the system shown in FIG. 11. An optical coupler 511c is used as the connecting member for 1–n ($n=2^m$) optical communication. In the present configuration, there is an attenuation by the insertion loss (3×m dB) between the third and fourth dispersion compensating fibers 210a and $210b_1$–$210b_n$ so that they are optically separated.

The third dispersion compensating fiber 210a and the fourth dispersion compensating fiber $210b_1$–$210b_n$ are serially connected.

In the second configuration, when the third and fourth dispersion compensating fibers 210a and 210b are to be further divided, the connecting schemes shown in FIGS. 6–8 may be adopted as they are in the first configuration.

A third configuration of the optical communication system of the present invention is now explained with reference to FIGS. 13 to 16.

In the third configuration, fifth and sixth dispersion compensating fibers 220a and 220b are serially connected to the eighth optical fiber 100c at an end facing the optical receiver 400 through a connecting member. A total length of the fifth and sixth dispersion compensating fibers 220a and 220b is long enough to compensate the dispersion of the eighth optical fiber 100c.

Figure 13:
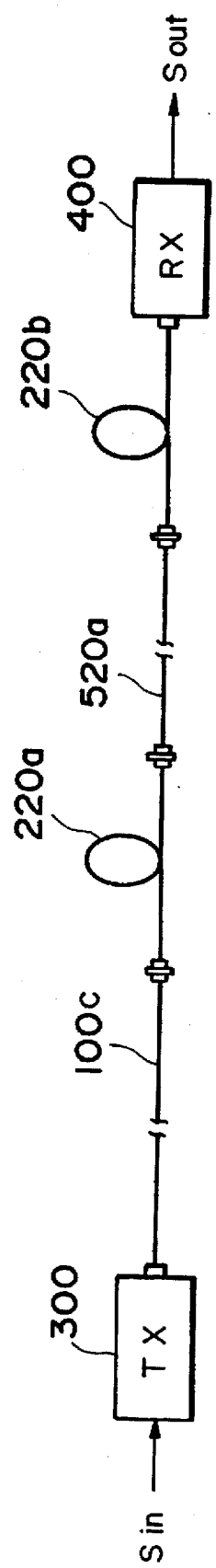
FIGS. 13 to 16 show applications of a third configuration of the optical communication system of the present invention.

As the connecting member, a ninth optical fiber (tenth optical fiber, eleventh optical fiber) 520a shown in FIG. 13 may be used. The optical fiber 520a may be used as a transmission path or it may be doped with $Er^{3+}$ for use as an optical fiber amplifier.

Figure 14:
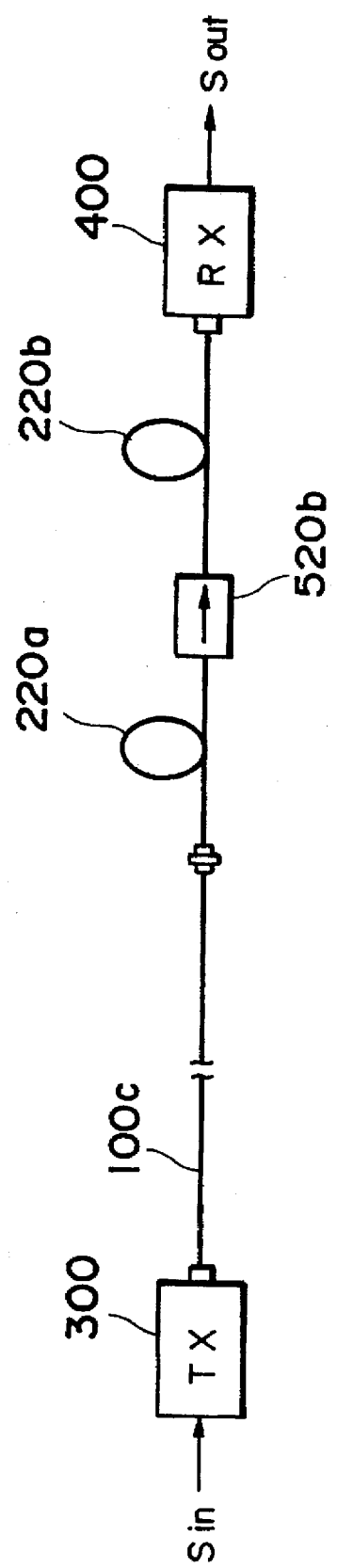

As another connecting member, an optical isolator shown in FIG. 14 may be used. It has been known that the optical isolator 520b is usually fabricated by using a YAG crystal containing Bi.

Figure 15:
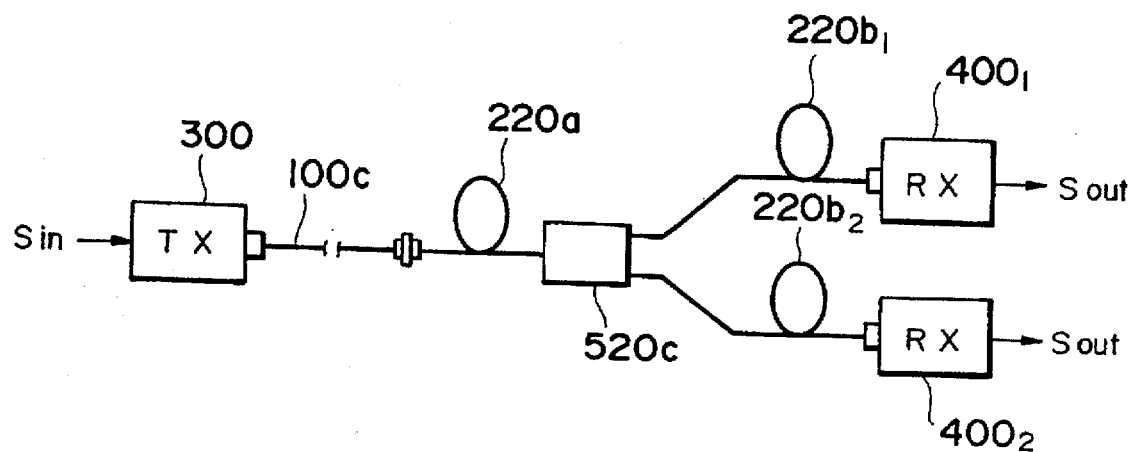

As a further connecting member, as shown in FIG. 15 (1–2 optical communication), an optical coupler 520c may be used and the rear scattered lights of the fifth and sixth dispersion compensating fibers 220a and $220b_1$ and $220b_2$ may be attenuated by an insertion loss of the optical coupler 520c.

Figure 16:
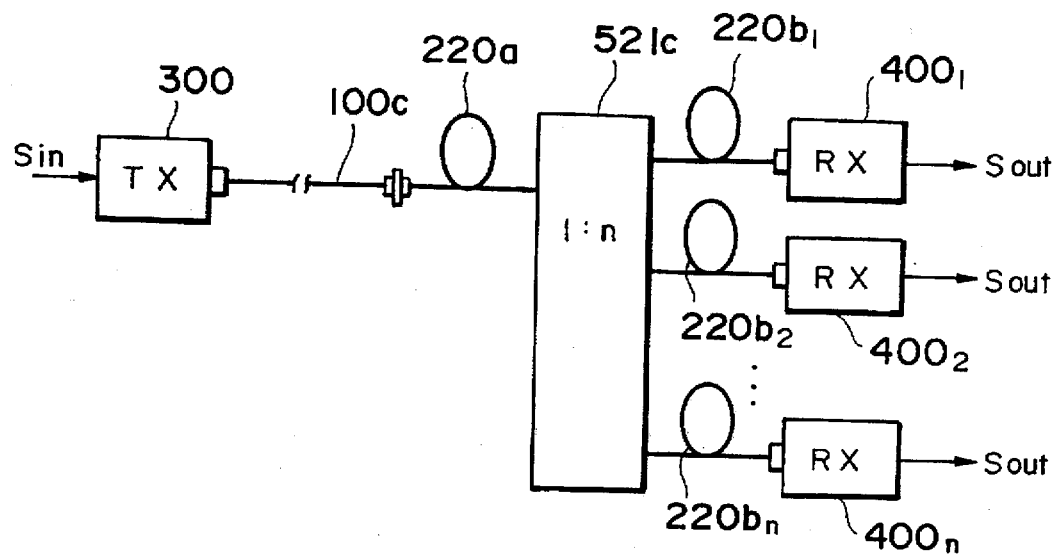

FIG. 16 shows a configuration for one-to-multi optical communication using the system shown in FIG. 15. The optical coupler 521c is used as the connecting member to attain the 1–n ($n=2^m$) optical communication. In the present configuration, there is an attenuation by the insertion loss (3×m dB) between the fifth and sixth dispersion compensating fibers 220a and $220b_1$–$220b_n$ so that they are optically separated.

The fifth dispersion compensating fiber 220a and the sixth dispersion compensating fiber $220b_1$–$220b_n$ are serially connected.

In the third configuration, when the fifth and sixth dispersion compensating fibers 220a and 220b ($220b_1$–$220b_n$) are to be further divided, the connecting schemes shown in FIGS. 6–8 may be adopted as they are in the first configuration.

In the first to third embodiments, the single-mode fiber for the 1.3 µm band is used as the optical fiber (100a, 100b, 100c) although a single mode fiber for a 1.55 µm band may be used to propagate a laser beam having a center wavelength of 1.3 µm. While the input signal Sin is for 40 channel AM-VSB signal, other analog signal (for example, FM, PM, FSK or PSK modulated signal) or digital signal may be used. A communication network (including an optical fiber network) such as a CATV network and a telephone path network may be connected to the optical transmitter 400.

As described above, the dispersion compensating fiber may be doped with $Er^{3+}$ and a pumping light may be injected to achieve the optical amplification.

By combining the optical communication systems of the present invention, a communication network having a various network topologies such as star, tree, loop or their combination thereof may be attained.

In accordance with the present invention, a plurality of divided dispersion compensating fibers of a predetermined length are serially inserted in the path of the optical fiber which is the transmission path and they are connected in series. Accordingly, in compensating the dispersion, the relative intensity noise is reduced, the CNR is improved and the improved optical communication with a longer communication distance is attained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A device for compensating dispersion of an optical fiber serving as a transmission path, comprising:

a plurality of dispersion compensating fibers arranged in series and optically connected to each other, each having an opposite sign of dispersion characteristic to that of said optical fiber; and an isolator arranged between a pair of said dispersion compensating fibers adjacent to each other within said plurality of dispersion compensating fibers.

2. A device according to claim 1, wherein each of said plurality of dispersion compensating fibers is selected from a predetermined portion of a single and continuous dispersion compensating fiber having an opposite sign of dispersion characteristic to that of said optical fiber.

3. A device according to claim 1, wherein each of said pair of dispersion compensating fibers sandwiching said isolator therebetween has a substantially same length.

4. A device for compensating dispersion of an optical fiber serving as a transmission path for a signal light having a predetermined wavelength, comprising:

a plurality of dispersion compensating fibers each of which is selected from a predetermined portion of a single and continuous dispersion compensating fiber having an opposite sign of dispersion characteristic to that of said optical fiber; and a member generating loss of light traveling in a reversed direction to that of said signal light, said member arranged between a pair of said dispersion compensating fibers adjacent to each other within said plurality of dispersion compensating fibers.

5. A device according to claim 4, wherein each of said pair of dispersion compensating fibers sandwiching said member therebetween has a substantially same length.

6. A device according to claim 4, wherein said member includes an isolator.

7. A device for compensating dispersion of an optical fiber serving as a transmission path for a signal light having a predetermined wavelength, comprising:

a first dispersion compensating fiber having an opposite sign of dispersion characteristic to that of said optical fiber; and a second dispersion compensating fiber having an opposite sign of dispersion characteristic to that of said optical fiber, one end of said second dispersion compensating fiber being optically connected to one end of said first dispersion compensating fiber, wherein a length of said first dispersion compensating fiber substantially equals to that of said second dispersion compensating fiber.

8. A device according to claim 7, further comprising a member generating loss of light traveling in a reversed direction to that of said signal light, said member arranged between said first and second dispersion compensating fibers.

9. A device according to claim 8, wherein said member includes an isolator.

10. A device according to claim 7, wherein each of said first and second dispersion compensating fibers is selected from a predetermined portion of a single and continuous dispersion compensating fiber having an opposite sign of dispersion characteristic to that of said optical fiber.

* * * * *